June 19, 1928.
R. S. SANFORD
BRAKE OPERATING MEANS
Filed March 4, 1926
1,674,303
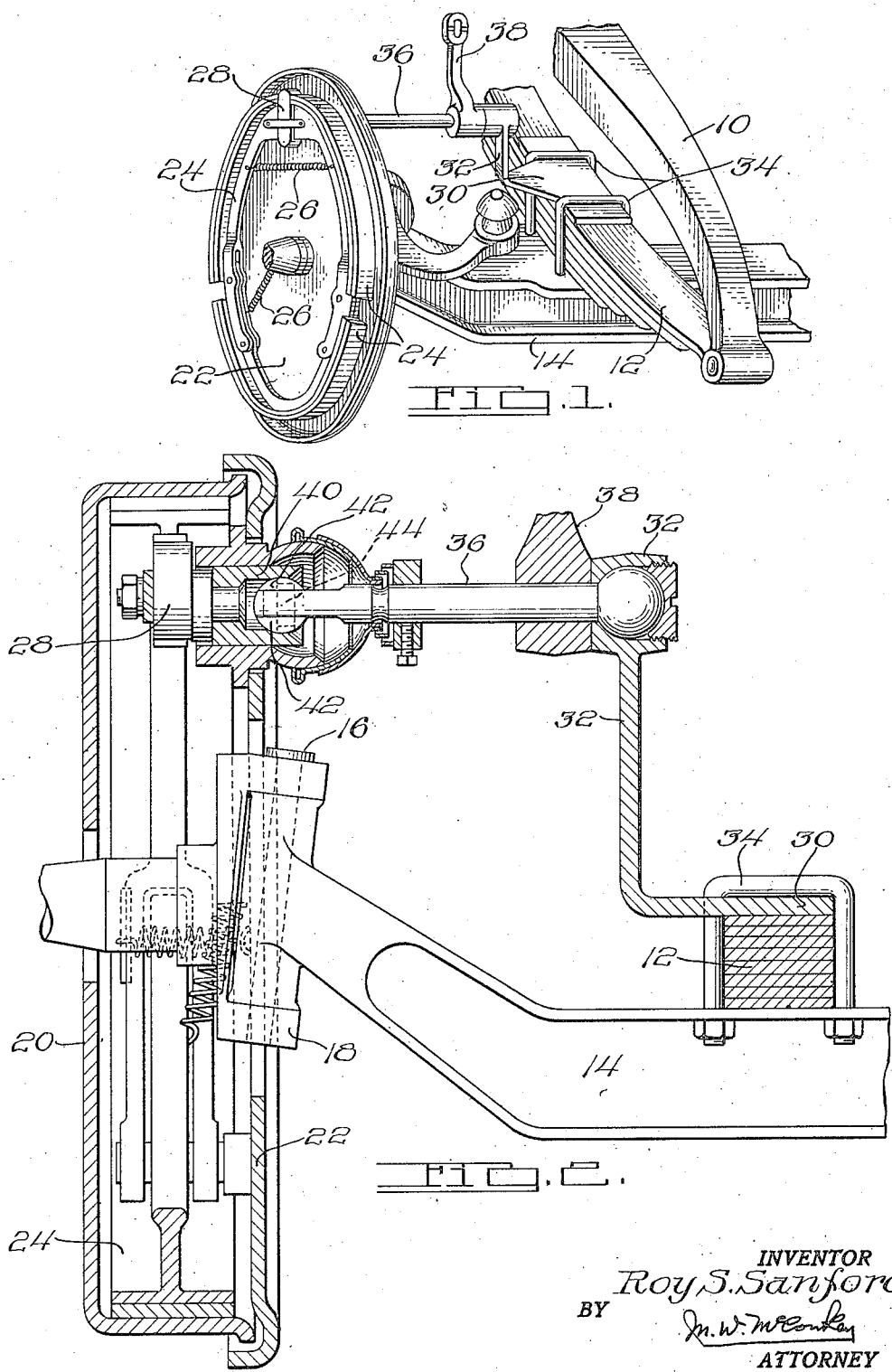
INVENTOR
Roy S. Sanford
BY
*M. W. McConkey*
ATTORNEY Patented June 19, 1928.

1,674,303

UNITED STATES PATENT OFFICE.

ROY S. SANFORD, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING MEANS.

Application filed March 4, 1926. Serial No. 92,129.

This invention relates to brakes, and is illustrated as embodied in novel operating means for a brake on an automobile wheel. An object of the invention is to provide a simple and inexpensive support for the brake-applying shaft, or equivalent brake-applying means, in cases where interference with the radiator or other reason prevents supporting it on the chassis frame, without requiring any modification of the axle.

According to the present invention, the means for securing the spring to the axle is utilized to support the brake-applying means, for example by providing a projecting supporting arm on the usual spring pad. Where the brake-applying means includes a horizontal shaft, it will ordinarily be supported at one end by this arm, and universally supported at its other end by the brake substantially at the swivelling axis of the wheel knuckle.

The above and other objects and features of the invention, including various novel combinations of parts and desirable particular constructions, will be apparent from the following description of one illustrative embodiment shown in the accompanying drawing, in which:

Fig. 1 is a partial perspective showing parts of the front axle and associated parts of an automobile chassis; and Fig. 2 is a vertical transverse section through the brake shown in Fig. 1.

The chassis illustrated includes a frame 10, supported by springs 12 on a front axle 14 and a rear axle (not shown). At the end of axle 14 there is swivelled, for example by a king pin 16, a knuckle 18 rotatably supporting a wheel (not shown).

The brake includes a drum 20, shown in Fig. 2 but not in Fig. 1, and which rotates with the wheel. The open side of the drum is closed by a backing plate 22 carried by knuckle 18. Brake shoes 24 anchored on plate 22 are arranged to be forced against the drum to apply the brake, against the resistance of return springs 26, by means such as a double cam 28. The particular brake illustrated is more fully described in Patent No. 1,567,716, granted to Bendix Brake Company on December 29, 1925, on an application filed by Adiel Y. Dodge.

The present invention relates to supporting the brake-applying means at least in part by the means for securing spring 12 to axle 14. In the particular embodiment illustrated, a spring pad 30, having an integral upwardly-projecting arm 32, rests on the top of the spring, the pad and the spring being encircled by U-bolts 34 clamping the spring to the axle. The brake-applying means is shown as including a shaft section 36 supported at its inner end by arm 32, and operated by a lever 38.

When used for a brake on a swivelled wheel, such a shaft section will ordinarily be universally connected to a short shaft section 40 carried by backing plate 22 and operating cam 28 or its equivalent, the universal joint being substantially at the swivelling axis of knuckle 18. The joint shown in the drawings includes outwardly cylindrical connectors 42 embracing the flattened end of shaft section 36 and swivelled thereto by a vertical pin 44, which connectors are arranged in a cylindrical cross bore in the end of shaft 40.

While one illustrative embodiment has been described in detail, it is not my intention to limit the scope of the invention to that particular embodiment, or otherwise than by the terms of the appended claims.

I claim:

1. In an automobile chassis having a front axle, a road wheel swiveled at the end thereof and provided with brake mechanism, a frame member, a spring supporting the frame member upon the axle, a pair of spaced apart shackles securing the spring to the axle, a bracket having a foot seated upon the spring between the shackles extending at each end underneath the shackles and secured to the spring thereby, said bracket having a supporting arm extending upwardly from the foot and provided with a bearing at its upper end, and a brake operating connection having one end connected with the brake mechanism and the other end mounted within the bearing at the upper end of the bracket so that said connection extends substantially horizontally.

2. In an automobile chassis having a front axle, a road wheel swiveled on the end of the axle, said road wheel provided with brake mechanism including a drum and retarding means associated therewith provided with an operating connection, a frame member, a spring supporting the frame member upon the axle a pair of spaced apart shackles securing the spring to the axle, a bracket having a foot seated on the spring between the shackles and extending at each end under the adjacent shackle and secured to the spring thereby, said bracket having an upright arm provided at its upper end with a bearing disposed substantially horizontally opposite said brake operating connection, and an operating rod connected at one end with said brake operating connection and supported at the opposite end by the bearing of the bracket for rotation whereby the rod extends substantially parallel to the axis of the brake drum.

In testimony whereof, I have hereunto signed my name.

ROY S. SANFORD.